United States Patent Office 2,702,276
Patented Feb. 15, 1955

---

2,702,276

WATER-DISPERSIBLE EMULSIONS OF POLYSILOXANES

Larry Q. Green, New Castle, Del., assignor to E. I. du Pont de Nemours and Company, Wilmington, Del., a corporation of Delaware No Drawing. Application April 10, 1951, Serial No. 220,360

10 Claims. (Cl. 252—8.6)

This invention relates to novel compositions of matter comprising organic polysiloxanes and characterized by ready dispersibility in water. More particularly, this invention deals with novel compositions of matter adapted for use in the textile and cleaning industries for lubricating or imparting water-repellency to nylon and similar synthetic hydrophobic fibers.

It is known that nylon, polyacrylonitrile fiber, polyethylene terephthalate fiber and other synthetic fibers which are not readily penetrated by aqueous solutions cannot effectively be rendered water-repellent by treatment with water-soluble water-repellency agents, for instance stearamidomethyl pyridinium chloride. It has also been known that organic polysiloxanes, for instance the liquid products described and claimed in U. S. Patent No. 2,491,843 are suitable for imparting water-repellency to textile fiber, both of the hydrophobic and non-hydrophobic types. (F. L. Bennett, Silk Journal and Rayon World, vol. 25, pages 52–53.)

Other polysiloxanes, for instance those described in U. S. Patents Nos. 2,469,888 and 2,469,890 have also been found useful for the treatment of textile fiber, and produce, for instance, softening or lubricating effects.

The difficulty with the suggested uses is that the polysiloxanes under discussion are not water-soluble. They must be applied to the fabric from aqueous dispersion, and the production of an aqueous emulsion often requires special apparatus and skill, limiting the use of these compounds to those establishments which are large enough to employ specialized personnel. It would appear off-hand that this problem could be solved by manufacturing and marketing these textile-treatment agents in the form of pastes or aqueous emulsions which would require only to be diluted to produce the desired treatment bath. It develops, however, that the polysiloxane compounds above referred to in conjunction with water-repellency are not stable in the presence of water, and will decompose during storage and marketing.

Accordingly, it is an object of this invention to provide textile treatment agents of the class hereinabove referred to in the form of a stable paste or emulsion which shall possess the ability of being extended easily with water, without requiring special procedures or special apparatus such as a colloid mill. Various other objects and achievements of this invention will appear as the description proceeds.

Now, I have found that when a polysiloxane of the aforementioned types is admixed with glycerine and a dispersing agent, an emulsion results which has the property of dispersing readily in water to give a uniform padding bath for the treatment of textile fiber. Moreover, the dispersion itself is stable physically, in the sense that it does not separate even when stored for six months, and chemically, in the sense that the polysiloxane does not exhibit any tendency to decompose or undergo chemical changes. Accordingly, my invention enables the manufacture and marketing of a concentrated paste or emulsion of the mentioned water-repellency agents, which can be readily converted by the consumer into a dilute aqueous padding bath by dilution with water accompanied by mild stirring.

I have found further that the proportion of polysiloxane to glycerine may be varied within very wide limits without defeating the objects of this invention. More particularly, my novel compositions may contain as little as 1 part of polysiloxane to 20 parts of glycerine to as much as 4 parts of the polysiloxane to 1 part of glycerine. In other words, the quantity of polysiloxane in the composition may vary from 5 to 80% of the combined weight of polysiloxane and glycerine. As for the dispersing agent, which may be of an anionic or cationic nature as more fully explained hereinbelow, it may be present in quantity as low as 0.25% with respect to the weight of the entire composition, or as high as 10%. There is, however, no special benefit apparent from using the larger quantities, and as a practical rule, 0.5% is to be taken as the preferred quantity.

Considering now the polysiloxanes to be employed in further detail, they may be classified in two general types:

*Type I—containing silicon-hydride bonds.*—These are described in more detail in U. S. Patent No. 2,491,843 (Wilcock), and are there expressed by the general formula—

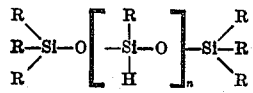

wherein the R's represent methyl radicals, and wherein $n$ is at least 1, but may be as high as 500. This type is of special interest for imparting water-repellency to hydrophobic, synthetic textile fiber (such as nylon, etc.).

*Type II—containing no silicon-hydride bonds.*—These are described more fully in U. S. Patents Nos. 2,469,888 and 2,469,890. They are defined by the general formula $R_{(2a+2)}Si_aO_{(a-1)}$, and may be strictly linear polymers or branched-chain polymers. But for the purpose of this invention I prefer to consider linear polymers corresponding to the formula—

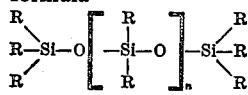

(wherein $n$ has the same significance as above while the R's represent alkyl radicals of not over 3 carbon atoms each). This type is most useful for lubricating or softening textile fiber.

Mixed emulsions of both types may also be used for various purposes.

Stated generally, I prefer for my invention those compounds of the above two types which are liquid at room temperature, and this is, to my knowledge, achieved generally by preferring for the R's alkyl radicals of not over 5 C-atoms, and limiting $n$ to a value not exceeding 500. Since $n$ in the above formula is often unknown, a more practical way of identifying a given individual compound or group of compounds of the above series is by its viscosity. For the purpose of this invention, those individuals or mixtures which have a viscosity not less than 50 centistokes are preferred, while the upper limit is immaterial and may be as high as 15,000.

The sensitivity of the above two types of polysiloxanes to water or alkali is not alike, Type I being more reactive. Accordingly, I find that best results are obtained with Type I if the composition contains also a trace of a salt having an acid reaction, for instance aluminum chloride or pyridine hydrochloride. By a trace, I mean a quantity of the order of 0.003% by weight based on the weight of the entire composition (although, of course, larger quantities may be employed), and its function apparently is to neutralize alkalinity of glass apparatus or the container with which the agent may come in contact during handling or storage.

Also, whereas both anionic and cationic types of dispersing agents seem to be equally satisfactory for polysiloxanes of Type II, cationic dispersing agents alone are to be preferred for Type I.

Without limiting my invention, the following examples are given to illustrate my preferred embodiments thereof. Parts mentioned are by weight.

Example 1

The silicone material utilized in this example consists of a mixture of homologous series of polysiloxanes having the general structure

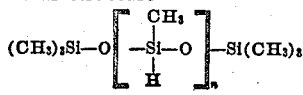

and whose viscosities range from 5 to 500 centistokes. An emulsion of this mixture was prepared by adding 39 parts of the polysiloxane material slowly, with rapid mechanical agitation, to a solution of 0.32 part of octadecyl-dimethyl-ethyl-ammonium bromide and 0.002 part of aluminum chloride in 20 parts of glycerine. A thick smooth white paste was readily formed.

I found this non-aqueous emulsion to be readily extended with water, yielding a dilute aqueous padding bath by simple hand stirring. When nylon fabrics were treated with this emulsion to a loading of 2%, dried and cured at 150° C. for 5 minutes, a high degree of water-repellency was imparted to them.

Example 2

The polysiloxane utilized in this example had the structure

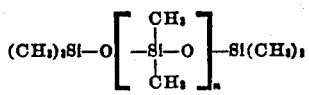

and a viscosity of 12,500 centistokes. This compound was emulsified by adding 19.5 grams slowly with mere hand agitation in a beaker to a solution of 0.32 gram of sodium alkyl ($C_6$ to $C_{15}$) phenyl sulfonate in 10 grams of glycerine. A smooth white paste was obtained. It was found to be readily extendible with water to give a dilute aqueous emulsion of fine particle size. Cotton broadcloth when treated with a 3% emulsion of this silicone had a soft full hand in contrast to an untreated control which was harsh.

A similar experiment using a silicone having a viscosity of 50 centistokes gave a white emulsion of similar properties and utility.

Example 3

A silicone solution was prepared by adding 3 parts of the silicone mixture described in Example 1 and 2 parts of the silicone described in Example 2. 78 parts of this mixture were then added slowly with mechanical agitation to 40 parts of glycerine containing 0.64 part of cetyl-pyridinium bromide as dispersing agent. A smooth stable white paste was formed. This emulsion was found to be readily extendible with water to give a dilute emulsion. Nylon fabric, immersed in this solution, dried and cured at 150° C. for 6 minutes, showed a high degree of water-repellency which exhibited excellent fastness to soaping and to organic solvents.

A portion of the emulsion prepared in this example was given an accelerated stability test by storing it at 60° C. for a period of one week, after which it was found still stable and unbroken. On application to nylon fabric, it was found to have retained all its original repellency power.

Example 4

A silicone mixture identical to that used in Example 3 was emulsified by adding 19.5 grams thereof, with mechanical stirring, to 4 grams of glycerine containing 0.5 gram of cetyl-pyridinium bromide. A very thick emulsion was obtained.

Example 5

A silicone mixture identical to that used in Example 3 was emulsified by adding 2 grams of it, with mechanical agitation, to 20 grams of glycerine containing 0.32 gram of octadecyl-dimethyl-ethyl-ammonium bromide. A creamy white emulsion was obtained.

Example 6

A silicone mixture identical to that used in Example 3 was emulsified by adding 78 grams thereof, with mechanical stirring, to 40 grams of glycerine containing 0.32 gram of cetyl-pyridinium bromide. A stable white pasty emulsion resulted. A similar emulsion was prepared in the same manner except that 10% of octadecyl-dimethyl-ethyl-ammonium bromide was used as dispersing agent. Here again a smooth, white, viscous emulsion was obtained.

Example 7

Five different polysiloxanes of the same general structure as that in Example 2 were successfully emulsified. These silicones had viscosities of 50, 100, 200, 500 and 1000 centistokes, respectively. They were emulsified in the same manner as in the above examples, that is by adding them slowly with agitation to glycerine containing a dispersing agent. In all cases viscous white emulsions were obtained.

Example 8

A number of emulsions were successfully prepared using the same polysiloxane mixture as in Example 3, but employing, in lieu of cetyl-pyridinium bromide, the dispersing agents named below:

(a) Octadecyl-dimethyl-benzyl ammonium chloride,
(b) Cetyl-trimethyl-ammonium chloride,
(c) Cetyl-trimethyl-ammonium bromide.

The procedure was to add 19.5 grams of the polysiloxane mixture named, slowly and with agitation, to 10 grams of glycerine containing 0.15 grams of the surface active agent. In all cases smooth white emulsions were obtained.

Example 9

A series of silicone emulsions were prepared similar to those in Example 7, except that a variety of different anionic dispersing agents was selected, as follows:

(a) Sodium oleyl N-methyl taurate

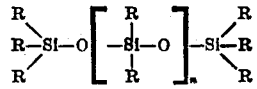

(b) Sulfated glyceride of lauric acid (prepared by sulfating the monolauric ester of glycerine),
(c) Sodium lauryl phenyl sulfonate,
(d) Sodium oleate,
(e) Sodium lauryl sulfate, and
(f) A higher alkyl sodium sulfonate ($C_{12}$ to $C_{16}$).

They were prepared by adding 19.5 grams of the 1000-centistoke-polysiloxane (structure given in Example 2), slowly with agitation, to 10 grams of glycerine containing 0.32 gram of the anionic dispersing agents. In all cases smooth white emulsions were obtained.

I claim as my invention:

1. A composition of matter consisting essentially of a non-aqueous emulsion of a linear polyalkyl-polysiloxane in glycerine containing an ionizable dispersing agent, the alkyl groups in said polyalkyl-polysiloxane containing not over 3 carbon atoms each, and said composition being characterized by good physical and chemical stability in storage and by being readily extendible with water to produce a uniform aqueous emulsion.

2. A composition of matter as in claim 1, the ratio of polysiloxane to glycerine by weight being not less than 0.05 and not more than 4.0.

3. A composition of matter consisting essentially of a non-aqueous emulsion in glycerine of a polyalkyl-polysiloxane of the general formula—

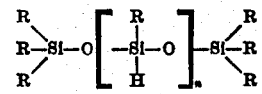

wherein the R's represent alkyl radicals of not over 3 carbon atoms each, while $n$ is an integer not less than 1 and not greater than 500, said composition containing further an ionizable dispersing agent and being characterized by being essentially stable in storage and by being readily extendible with water to produce a uniform aqueous emulsion.

4. A composition of matter as in claim 3, the polyalkyl-polysiloxane being one having a viscosity of not less than 50 centistokes.

5. A composition of matter as in claim 4, the proportion of polysiloxane being between 5 and 80% of the combined weight of polysiloxane and glycerine, and the quantity of dispersing agent being between 0.25 and 10% by weight of the entire composition.

6. A composition of matter consisting essentially of a non-aqueous emulsion in glycerine of a polyalkyl-polysiloxane of the general formula— wherein R represents the methyl radical while $n$ is an integer not less than 1 and not greater than 500, said composition containing further a cationic dispersing agent and being characterized by being essentially stable in storage and by being readily extendible with water to produce a uniform aqueous emulsion.

7. A composition of matter as in claim 6, wherein the polysiloxane ingredient is a mixture of individual polymethyl-polysiloxanes of the formula therein set forth and having viscosities ranging from 5 to 500 centistokes.

8. A composition of matter as in claim 6, the proportion of polysiloxane being between 5 and 80% of the combined weight of polysiloxane and glycerine, and the quantity of dispersing agent being between 0.25 and 10% by weight of the entire composition.

9. A composition of matter consisting essentially of a non-aqueous emulsion in glycerine of a polyalkyl-polysiloxane mixture comprising linear polyalkyl-polysiloxanes wherein the alkyl groups contain not over 3 carbon atoms each and wherein the Si atoms contain no free H-atoms, and linear polymethyl-polysiloxanes wherein each non-terminal Si-atom bears one free H-atom, said composition containing further a cationic dispersing agent and being characterized by being essentially stable in storage and by being readily extendible with water to produce a uniform aqueous emulsion.

10. A composition of matter as in claim 9, the combined proportion of polysiloxanes being between 5 and 80% of the combined weight of total polysiloxanes and glycerine, and the quantity of dispersing agent being between 0.25 and 10% by weight of the entire composition.

References Cited in the file of this patent

UNITED STATES PATENTS

| | | |
|---|---|---|
| 2,450,221 | Ashburn et al. | Sept. 28, 1948 |
| 2,588,365 | Dennett | Mar. 11, 1952 |
| 2,626,870 | Cooke et al. | Jan. 27, 1953 |

OTHER REFERENCES

Dow Corning Silicones (1947), by Dow Corning, page 7.

Dow Corning Silicone Mold Release Agents (1948), by Dow Corning Corp., Midland, Mich., page 12.

Silicone Notes—Dow Corning Corp., Midland, Mich., March 8, 1948, pages 1 and 2 are pertinent.